United States Patent

Aparicio, IV et al.

[11] Patent Number: 5,727,174
[45] Date of Patent: Mar. 10, 1998

[54] GRAPHICAL END-USER INTERFACE FOR INTELLIGENT ASSISTANTS

[75] Inventors: Manuel Aparicio, IV, Arlington; Roger A. Chang, Irving, both of Tex.

[73] Assignee: International Business Machines Corporation, Armonk, N.Y.

[21] Appl. No.: 855,817

[22] Filed: Mar. 23, 1992

[51] Int. Cl.[6] .................................................. G06F 3/100
[52] U.S. Cl. .................................. 395/348; 395/336
[58] Field of Search ................................ 395/155, 159, 395/161, 348, 333, 334, 335, 336

[56] References Cited

U.S. PATENT DOCUMENTS

| | | | |
|---|---|---|---|
| 5,202,828 | 4/1993 | Vertelney et al. | 395/159 X |
| 5,276,816 | 1/1994 | Cavendish et al. | 395/159 X |
| 5,287,448 | 2/1994 | Nicol et al. | 395/159 |

FOREIGN PATENT DOCUMENTS 0269364  11/1987  European Pat. Off. .

OTHER PUBLICATIONS

Aaron Marcus et al., "User–Interface Developments for the Nineties", Computer, Sep. 21, 1991, pp. 49–57.
"Balloon Windows For Supplementary Dialogues and Information", IBM Technical Technical Disclosure Bulletin, Vol. 33 No. 10A, Mar. 1991.
Lotus® 1–2–3 for Windows (Sams), 1991, pp. 18,32–36.
Wordperfect for Windows (Trademark of Wordperfect Corporation), 1991, pp. 1–7.

*Primary Examiner*—Heather R. Herndon
*Assistant Examiner*—Cliff N. Vo
*Attorney, Agent, or Firm*—Jonathan E. Jobe, Jr.; Edward Duffield; Andrew J. Dillon

[57] ABSTRACT

A graphical user interface for a computer system that includes one or more intelligent assistants. The interface includes composite icons comprising a graphical representation of a human figure, a representation of a desk, and a mini-icon that associates an assistant with the object it supports. The assistant's desk can be opened to show its contents and the human figure can move from its position next to the desk to a position on the computer display screen next to a suggestions dialog box that displays suggested actions to the user.

7 Claims, 7 Drawing Sheets

GRAPHICAL END-USER INTERFACE FOR INTELLIGENT ASSISTANTS

BACKGROUND OF THE INVENTION

1. Field of the Invention

The present invention relates generally to computer system end user interfaces and more particularly to a graphical end user interface that includes intelligent agents or assistants.

2. Description of the Prior Art

In certain currently existing computer systems with graphical user interfaces, an environment is created that is an electronic metaphor for a workplace or desktop. Objects found in the electronic workplace are presented for users to manipulate in ways that are similar to the way that they are manipulated in the real workplace. Objects, such as file cabinets, folders, documents, and printers, are displayed on the display screen as icons. Users manipulate these icons with the mouse to perform desired operations. For example, to file a document in a folder that is located in a file cabinet in the real workplace, the user opens the file cabinet, locates and opens the correct folder, and puts the document inside it. In the electronic workplace, the user performs a similar process. The user opens the file cabinet, locates the correct folder, and drops the document icon on the folder icon. Users have been able to use their knowledge of a real workplace to perform this operation.

While the workplace or desktop metaphor provides certain advantages to the user in terms of intuitiveness and ease of use, many have suggested that the next step in personal computing will move beyond the desktop metaphor and its arrangement of passive objects toward a theater metaphor of active agents. In the theater metaphor, work is delegated to animated intelligent objects that operate like secretaries or assistants.

Commercialization of these ideas has just begun. For example, Hewlett Packard Company has introduced "agents" in its New Wave product. However, these agents are not truly intelligent. Each agent is merely a macro-capturing facility, which records and plays back a sequence of commands as performed by the user. This ability to replay what is called a "script" is the lowest form of artificial intelligence. It includes no ability for deductive inference or inductive discovery. In the New Wave product, the user records an action sequence by simply performing the action, but any subsequent variablization of the macro must be programmed by the user, if the user knows the macro language. The agent of the New Wave product is still passive; the script is activated only when the user gives it another object to work on, such as a spreadsheet to be formatted and printed. The next logical step in artificial intelligence is to add a rule-based inferencing system. There has been some activity to build such intelligent office systems and interfaces and it appears that such work has been and will soon be commercialized as an electronic mail function.

There is no question that rule-based agents are required for intelligent office systems. By definition, rules are required for corporate policies and regulations. The enterprise needs to define that certain objects cannot be printed, for example. Rules are also the only way for the user to give instructions before going on vacation; there is no behavior to learn-by-example because the user is not around. Simple rules can also be appropriate and well-formed by the user to handle many trivial jobs, such as automatic sorting of mail under appropriate key words.

On the other hand, the difficulties of rule expression, rule-based consistency, and a host of well known knowledge engineering problems suggest the need for case-based reasoning and an adaptive system that can automatically learn by example. The user's own behavior provides the defacto validity and completeness and does not require the end user's explicit activities in knowledge engineering. Automated knowledge acquisition is needed for all expert systems, but the many problems of knowledge acquisition are exacerbated if the general office worker is asked also to become a knowledge engineer.

In co-pending U.S. patent application Ser. No. 07/720,278, filed Jun. 24, 1991, entitled CONVOLUTIONAL EXPERT NEURAL SYSTEM, now U.S. Pat. No. 5,357,597, assigned to the assignee of the present application, the disclosure of which application is incorporated herein, there is disclosed an adaptive neural system that exhibits continuous and instant learning, and a perfect memory. The system of application Ser. No. 07/720,278, has the ability to observe inputs and outputs, or conditions and results, and derive the rules that determine the outcome or result of various sets or combinations of inputs or conditions. Thus, the system of application Ser. No. 07/720,278, promises to be an effective engine for intelligent assistants or agents.

The suggestion that agents or assistants will appear as "little people" on the screen has already been made; however, little has been actually done to establish the display and metaphor of its explicit interface architecture. The graphical portrayals in other systems agents are still primitive. For example, the New Wave product uses the simple bust of a "secret agent", without any animation or multiple operations. Moreover, no system has adequately dealt with the problem of presenting different forms of intelligence within a graphical metaphor for the user. Various forms of intelligence are possible and should be used together, but this raises problems about how such different forms can be represented.

SUMMARY OF THE INVENTION

The present invention provides a method of and system for displaying a set of assistants and their respective objects of responsibility together with their respective function and control and a method and system for displaying and invoking inferenced suggestions. All assistants are collected and managed within a "Bullpen." The workplace or desktop contains an "Assistants" object or icon, which can be opened to show the set of assistants. Each assistant is associated with an object. Each assistant icon includes a graphical human figure and a graphical representation of a desk that has thereon an iconic representation of the object that the assistant serves. For example, in the preferred embodiment, one assistant handles documents, as shown by a document object icon placed on the assistant's desk. The metaphor used is that each assistant is a software robot, each with its own desk, and with its responsibility demonstrated by the object on its desk. Global properties are also included in the bullpen. Global properties are those that are not given to only one object but are displayed to the separate objects in the bullpen. For example, in the preferred embodiment, a list of facts, such as the user's name, position code, vacation time, and the like, is displayed in a bulletin board object. Each assistant keeps its own set of rules, but all the assistants use the same set of global facts which the user can maintain in one place.

In the present invention, the assistant's "learning" is located within its head. The adaptive form of intelligence is provided by neural network methods, and as such is located within the assistant's "brain." Clicking on the head of the assistant's graphical human figure opens it to the neural representation of what the assistant has learned about objects of the particular class. The user can view the relevant variables for the assistant's actions and exercise "what-ifs."

User developed rules for each object are located in the assistant's desk. Clicking on the desk opens it to a window that contains its contents. Rules are not learned, but are specifically stated to each assistant. To maintain separation of this knowledge from that which is learned, such rules are characterized as "instructions" to the assistant from the system user and are kept as a document or list object within the assistant's desk. Enterprise regulations are also located in the desk. Regulations, like user instructions, are not learned but are by definition simply stated as rules. This affords an object-oriented place for a corporate enterprise to establish rules and an easy to use metaphor for the user to find and reference them. Performance reports and management controls may also be located in the desk. This is a metaphor for an employee's performance record as a document kept in a real desk. The record of performance for both the neural network and the user-defined rules, such as frequency of use and inferencial decisions versus actual outcome, can be accessed within this object. Threshold setting, performance trade-offs, and the like can be managed from this information.

Object-relevant vocabulary may also be kept within the desk. As voice recognition is incorporated into the manipulation of object-oriented interfaces, a proper metaphor for its use should be included. The idea is that the user will broadcast a command such as "Call John Adams" and the appropriate assistant (in this case the phone assistant) will then take the commanded action rather than the user saying something like "Telephone, call John Adams." In natural interaction, people do not speak to inanimate objects. Vocabularies are defined within the scope of a particular object. The definition of that vocabulary, which are those commands that the assistant can understand and respond to, can be made here.

In the present invention, each assistant can make recommendations or suggestions that can be requested from the action bar of the serviced object window. For example, within the context of a particular mail document, the assistant can be called, whereupon it will leave its desk in the bullpen and then appear floating next to the opened document holding a list of actions. The assistant is not a normal object within a presentation window. Rather, it is separate as a special type of object that can traverse the system or screen. In the preferred embodiment, each assistant can learn whether or not to display its suggestions automatically. When the user asks for suggestions from the action bar, the user is committing an action, like any other, that the assistant can learn to predict. If the assistant learns the conditions under which the user will request its suggestions, the assistant can automatically present itself when a proper instance of the object is opened. Clicking on the assistant's feet will cancel its presence. The assistant's feet are, in effect, its "cancel" button. Clicking on its feet will cause the suggestion list to disappear and the assistant to return to its desk. Clicking on any item of the list of suggestions will cause that one suggestion to be selected and highlighted. In the preferred embodiment, the assistant icon has displayed adjacent to its head a quotation bubble with the word "Okay?" in it. Clicking on the quote bubble will invoke all selected actions in the list of suggestions and the assistant will return to its desk. Clicking on the assistant's head will display its current reasoning.

DESCRIPTION OF THE PREFERRED EMBODIMENT

Figure 1:
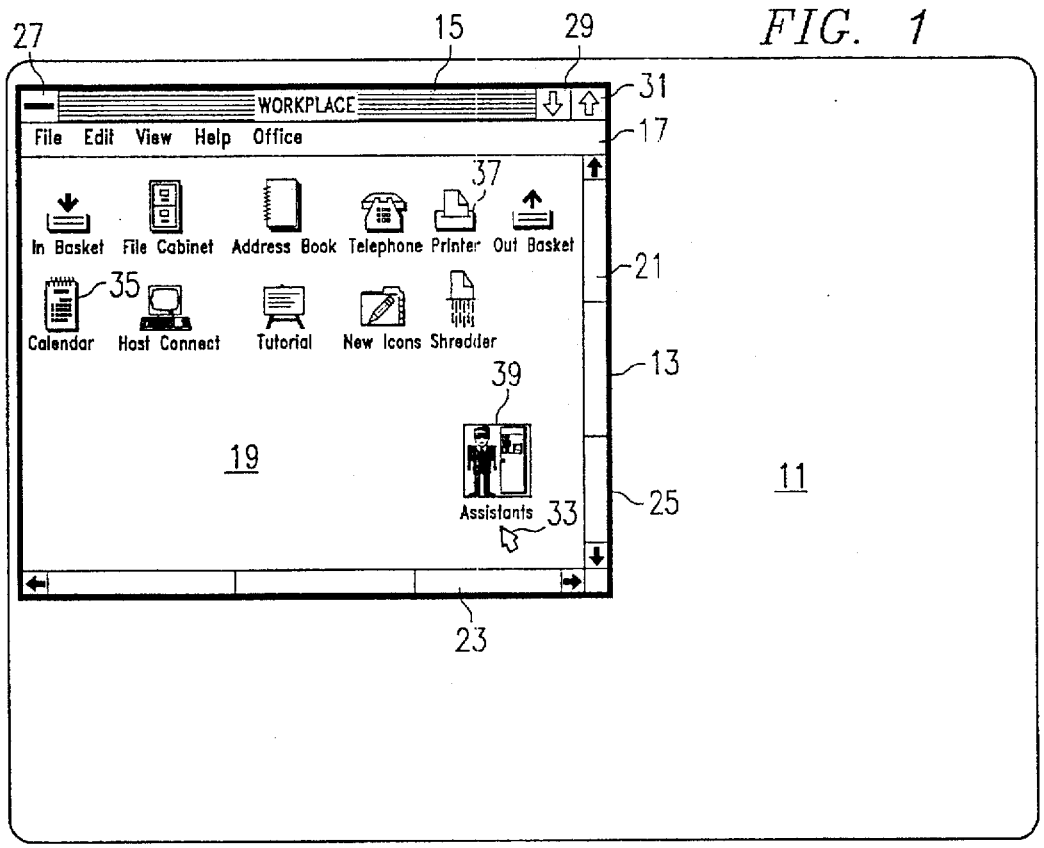
FIG. 1 is a pictorial view of a computer system display screen with a "WORKPLACE" window display thereon including an Assistants icon.

Referring now to the drawings, and first to FIG. 1, a computer system display screen is designated generally by the numeral 11. Display screen 11 has displayed therein a window 13. Window 13 includes a title bar 15, an action bar 17, a client area 19, and scroll bars 21 and 23, all of which are enclosed in a window border 25.

Title bar 15 includes, in addition to a label that identifies window 13 as the "Workplace" window, a system menu icon 27 and sizing icons 29 and 31. System menu icon enables a user to display a pull-down menu of actions that can be performed on the window itself rather than the object or objects displayed in the window. For example, the user can use system menu icon 27 to move or close window 13. Sizing icons 29 and 31 provide a convenient way for the user to minimize or maximize, respectively, window 13.

Action bar 17 includes a list of actions that can be performed on the object or objects in window 13. The user can move a pointer 33 with a mouse (not shown) to select various objects in window 13 and then invoke various actions from pull-down menus that can be displayed beneath the items of action bar 17. Client area 19 of window 13 is populated with a plurality of objects represented by icons. In the workplace environment, the objects are electronic metaphors for objects that a user would find in a real workplace. For example, the workplace environment includes a calendar icon 35, which represents an electronic calendar object or application. The user can open calendar icon 35 and use it in ways similar to the way people use real calendars. Similarly, the workplace environment includes a printer icon 37. The user can, by direct manipulation, use the mouse and pointer 33 to move a graphical representation of a document to printer icon 37 and thereby cause the document to be printed.

Workplace window 13 includes, in addition to normal office equipment objects, such as calendar 35 or printer 37, an assistants object represented by assistants icon 39. As will be explained in detail hereinafter, the system of the present invention includes a plurality of intelligent assistants that are assigned to various objects in the electronic workplace. The assistants have the capacity to learn rules regarding how various objects are to be handled, either by observation of how the user handles the objects or by receiving instructions or regulations from the user or the enterprise for which the user works. Preferably, the assistants include neural networks of the type disclosed in co-pending U.S. patent application Ser. No. 07/720,278, filed Jun. 24, 1991, entitled CONVOLUTIONAL EXPERT NEURAL SYSTEM, assigned to the assignee of the present application, the disclosure of which application is incorporated herein.

Figure 2:
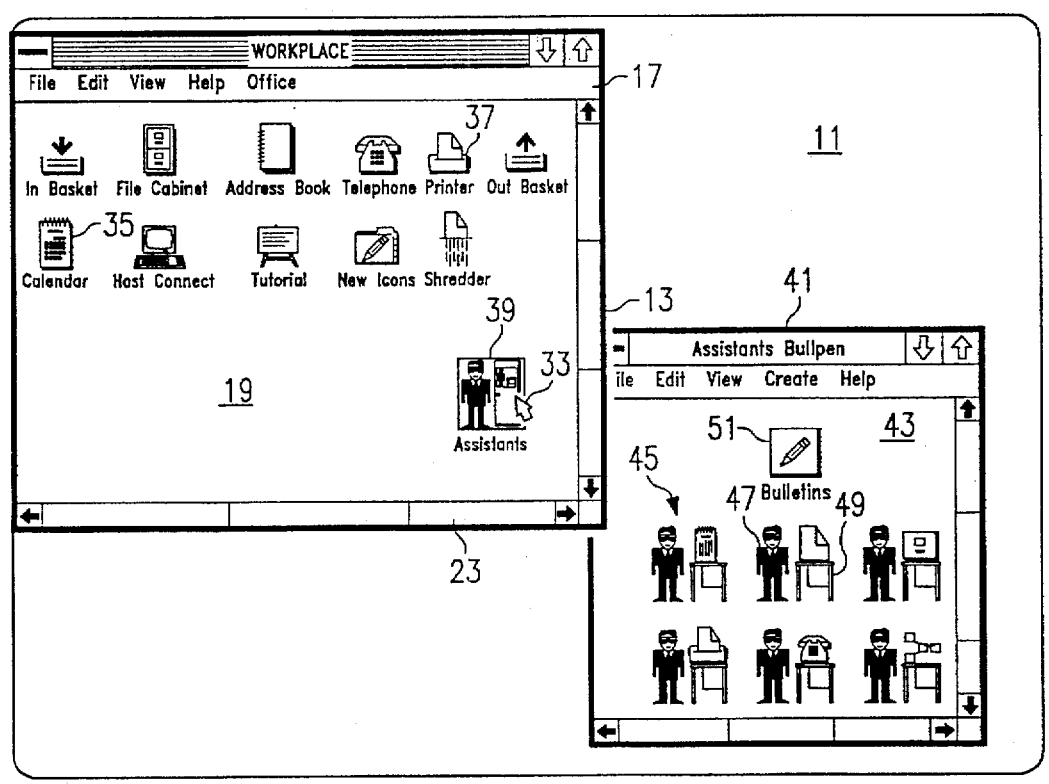
FIG. 2 is a pictorial view similar to FIG. 1 but including an "Assistants Bullpen" window.

Referring now to FIG. 2, there is shown in addition to workplace window 13, an Assistants Bullpen window 41. Assistants Bullpen window 41 is similar to window 13 in that it includes a title bar, an action bar, and scroll bars. However, the client area 43 is populated with a plurality of assistants icons, including, for example, a document assistant icon, which is designated generally by the numeral 45. Document assistant icon 45 includes a graphical representation of a human FIG. 47 and a mini-desk 49 which has displayed thereon an iconic representation of a document, which identifies icon 45 as a document assistant. In similar fashion, each of the other assistant icons in Assistants Bullpen window 41 include a graphical representation of a human figure in a mini-desk with an iconic representation of the object that the assistant supports. Additionally, Assistants Bullpen window 41 includes a bulletins object that is represented by a Bulletins icon 51. Bulletins icon 51 can be opened to display a window into which the user can input facts that the assistants may need in order to perform their functions. For example, if the user is going to be out of the office on vacation, the user can identify his or her backup and tell all assistants what dates the user will be out of the office. As those skilled in the art recognize, windows can be opened by double clicking on an icon, or selecting an icon and then selecting the open action from the pull-down menu associated with the "File" item of action bar 17.

Figure 3:
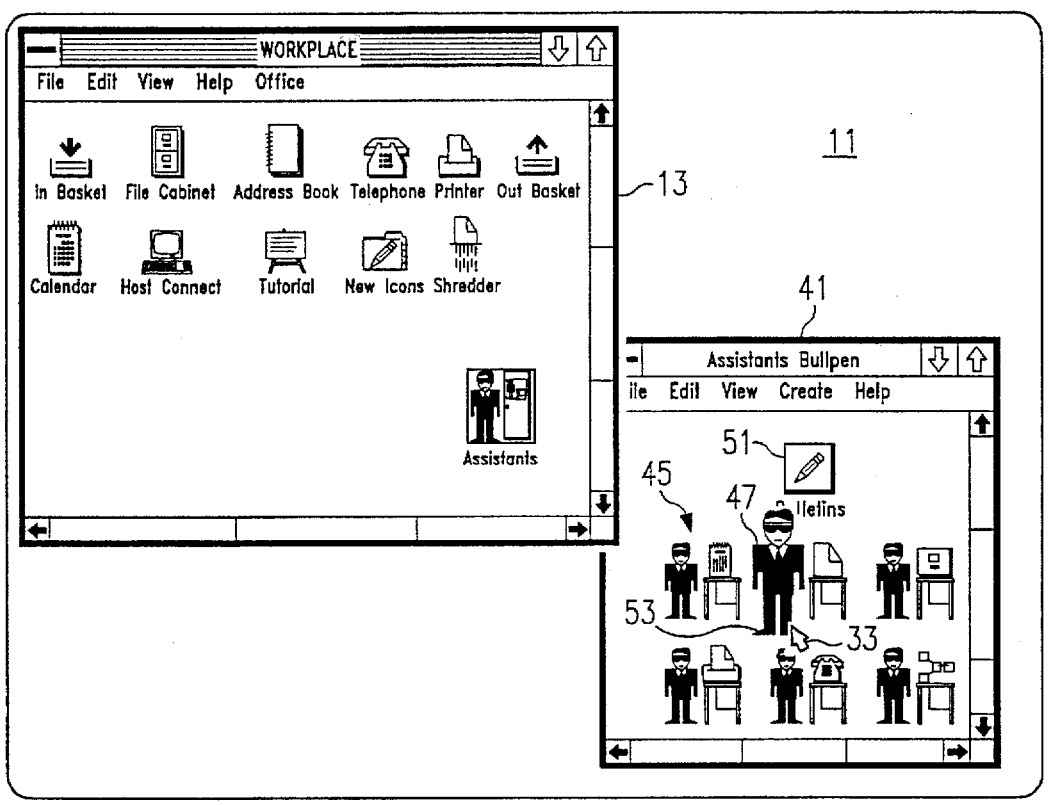
FIG. 3 is a pictorial view similar to FIG. 2 in which an assistant icon is enlarged.

Referring now to FIG. 3, human FIG. 47 of document assistant icon 45 is shown enlarged. The figures of the assistant icons can be enlarged by clicking pointer 33 on the feet 53 of the figures. The human figures may be enlarged to provide more functionality to the interface. For example, a user might obtain help by clicking on the figure's shoulder and dismiss the help by clicking on the figure's mouth. Whenever the assistant icon is in the Assistants Bullpen window 41, clicking on the figures feet will toggle the figure between its large size and its small size. The metaphor is that of the assistant coming to attention and going back to his desk.

Figure 4:
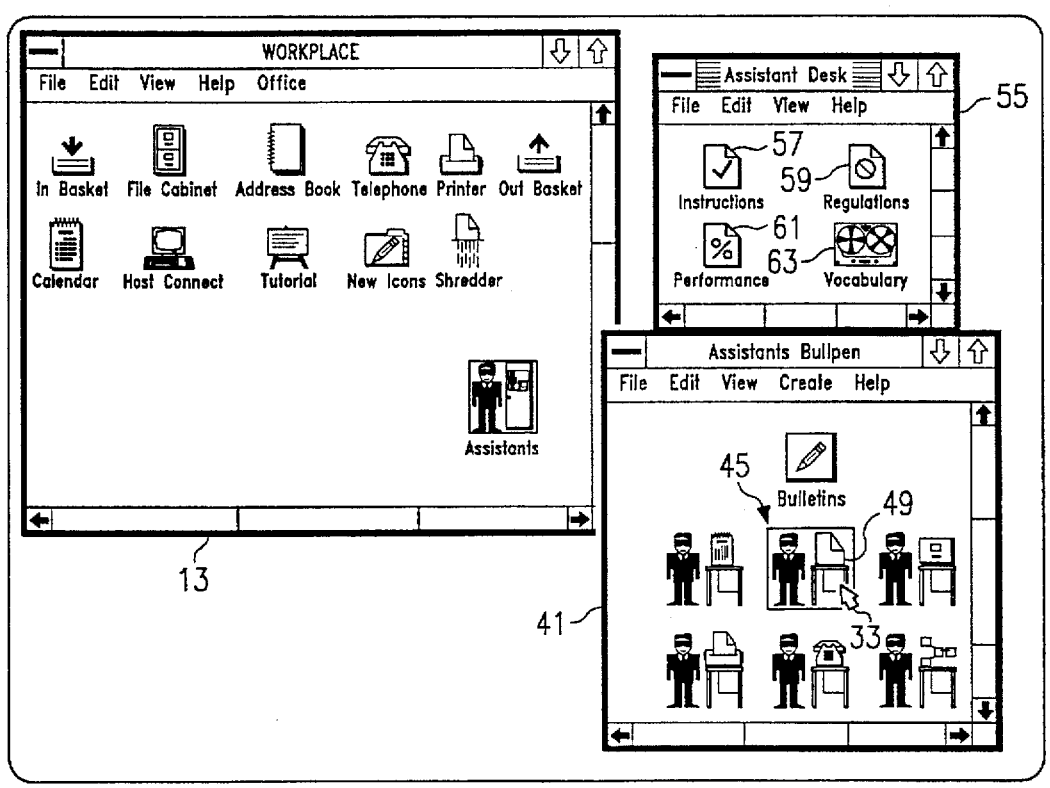
FIG. 4 is a pictorial view similar to FIG. 2 but including an "Assistant Desk" window.

Referring now to FIG. 4, there is shown, in addition to workplace window 13 and Assistants Bullpen window 41, an Assistant Desk window 55. Assistant Desk window 55 is preferably opened by double clicking pointer 33 on mini-desk 49 of document assistant 45. Assistant Desk window 55 includes various objects, including instructions 57, regulations 59, performance 61, and vocabulary 63. Instructions icon 57 represents user defined rules provided to the assistant. Instructions are not learned through observation, but are simply given to the assistant. For example, the user may instruct the assistant always to print correspondence from the user's immediate supervisor.

Regulations icon 59 represents enterprise regulations. For example, it may be an enterprise regulation that documents carrying a certain security classification cannot be printed on printers located in uncontrolled spaces. Such regulations are made available to the assistant, perhaps as a constraint against any other inference.

Performance icon 61 represents an object that contains a record of the performance for both the neural network and the user-defined rules, such as frequency of use and inferential decisions versus actual outcome. The performance data provides a means by which the performance of the system may be evaluated and enhanced. Vocabulary icon 63 represents object-relevant terms to which the assistant responds. As voice recognition is incorporated into the manipulation of object-oriented interfaces, each assistant will have a set of vocabulary that it can understand and respond to.

Figure 5:
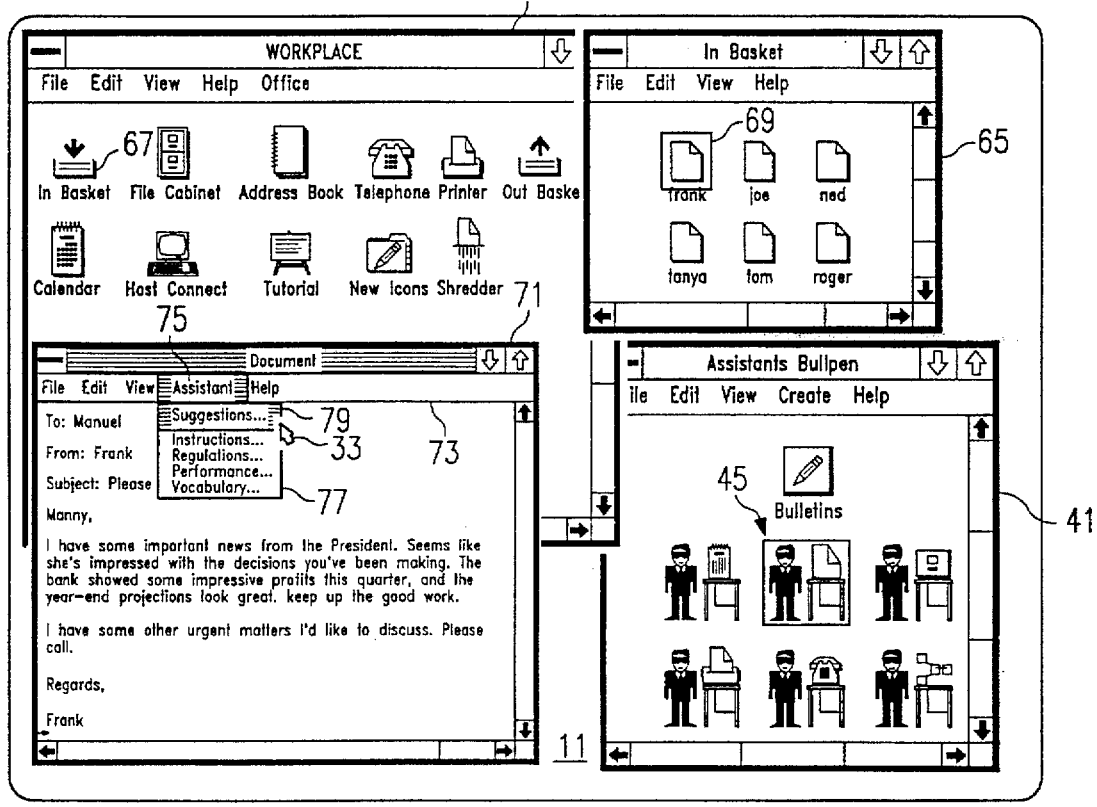
FIG. 5 is a view similar to FIG. 2 but including an "Inbasket" window and a "Document" window.

Referring now to FIG. 5, the user has opened an Inbasket window 65. In-basket window 65 was preferably opened by double-clicking on Inbasket icon 67 of Workplace window 13. In-basket window 65 contains incoming electronic mail documents that the user has received. In FIG. 5, the user has selected to view document 69 in In Basket window 65 and has opened a Document window 71.

Document window 71 includes an action bar 73 that includes an "Assistant" action item 75. In the present invention, whenever an object has an assistant assigned to it the system inserts an Assistant item in the action bar for that object's window. In FIG. 5, the user has selected Assistant item 75 and the system has displayed an assistant pull-down menu 77. Assistant pull-down menu 77 includes a Suggestions item 79, as well as the items that are contained in the assistant's desk. Documents assistant 45 has "reviewed" the document of window 71 and it has, either by having observed the user's past actions or by reference to instructions or regulations, formulated a set of actions that the user is likely to perform on the document. The assistant may automatically cause the system to perform certain actions "on its own" without input from the user; however, in the preferred embodiment of the invention, the assistant normally does not cause the system to perform those actions without the concurrence of the user. Thus, those actions are presented to the user as suggestions. If the user wishes to look at the suggested actions, the user may select suggestions item 79 with pointer 33 and thereby cause the system to display a Suggestions dialog box 81, as shown in FIG. 6.

Figure 6:
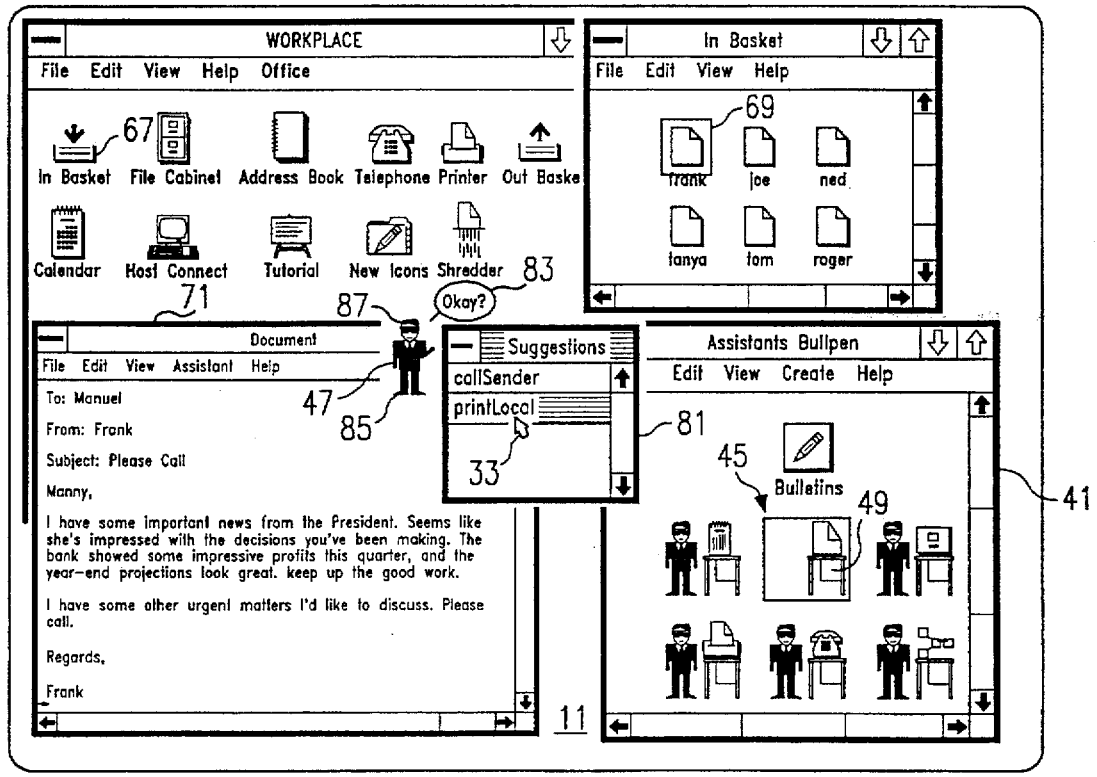
FIG. 6 is a pictorial view similar to FIG. 5 including a "Suggestions" window.

Referring to FIG. 6, Suggestions dialog box 81 is shown as if human FIG. 47 is holding it. In FIG. 6, human FIG. 47 has left its position next to mini desk 49 in window 41. FIG. 47 has displayed next to its head a speech bubble 83 that has the word "Okay?" in it. Speech bubble 83 functions in the same way as the "Okay?" pushbutton in a normal dialog box. However, speech bubble 83 provides a more anthropomorphic feel to the interface.

Suggestions dialog box 81 contains a list of suggested actions, including "callSender" and "printLocal." Thus, the document assistant has suggested that the user call the sender of the document and print the document locally. Again, the assistant waits for the user's concurrence before performing the action. However, in the preferred embodiment, the assistant may take certain actions to facilitate performance of the action. For example, since one of the suggestions is callSender, the assistant may look up "Frank's" (the sender) telephone number and perform other prerequisite activities to enhance system performance. The user can cause the system to perform the suggested actions by selecting the various suggestions with pointer 33. If the user desires to have the system perform the selected suggested actions, the user can do so by clicking on speech bubble 83. If the user does not want to have the system perform any of the suggested actions, the user may cancel the suggestions by clicking on the feet 85 of human FIG. 47. Thus, feet 85 are equivalent to the "cancel" pushbutton of a normal dialog box. Suggestions dialog box 81 will remain on screen 11 until the user either cancels it by clicking on feet 85 or performs the selected suggested actions by clicking on speech button 83. When suggestions dialog box 81 is dismissed, human figure 47 returns to its position next to mini-desk 49 of assistants bullpen window 41.

Figure 7:
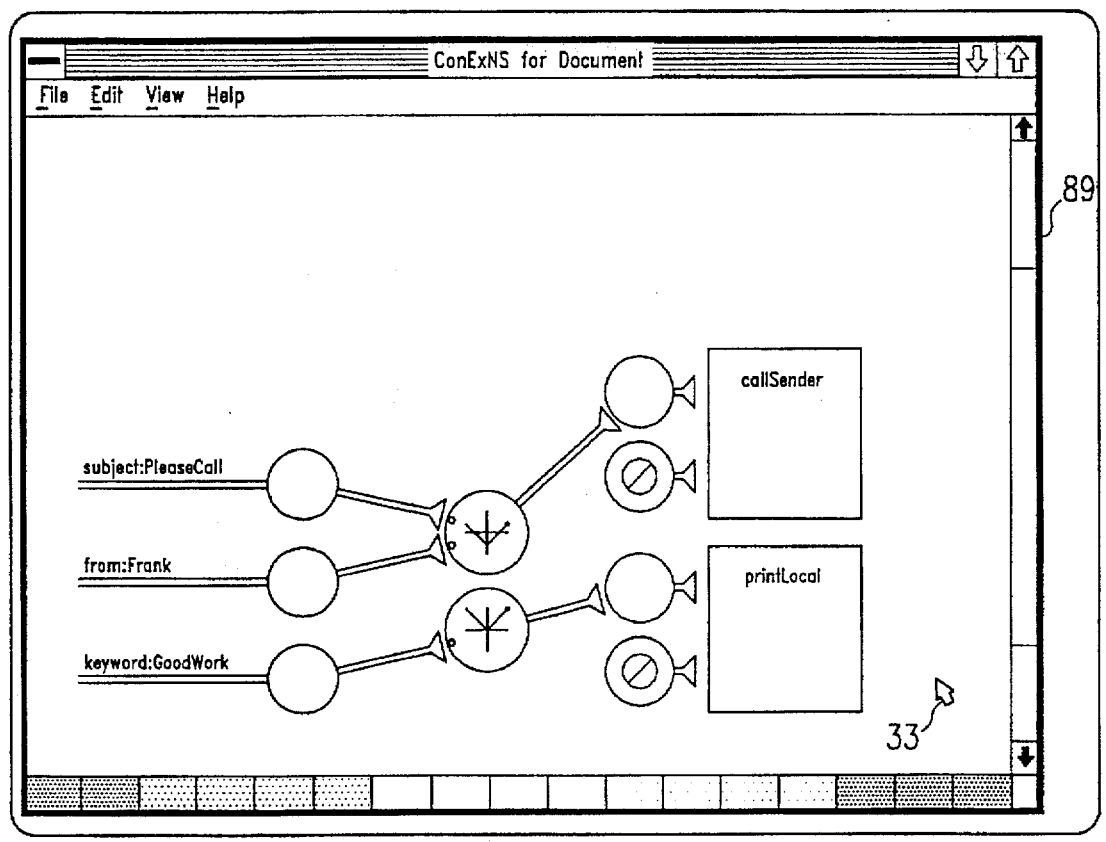
FIG. 7 is a pictorial view of a a neural network window displayed on a computer display screen.

If the user desires to understand how the assistant came to the suggestions of dialog box 81, the user may click on the head 87 of FIG. 47, which will cause the system to display a neural network window 89, as shown in FIG. 7. Referring to FIG. 7, neural network 89 shows two neurons, which indicate how the assistant arrived at its suggestions to call the sender and print the document locally.

Figure 8:
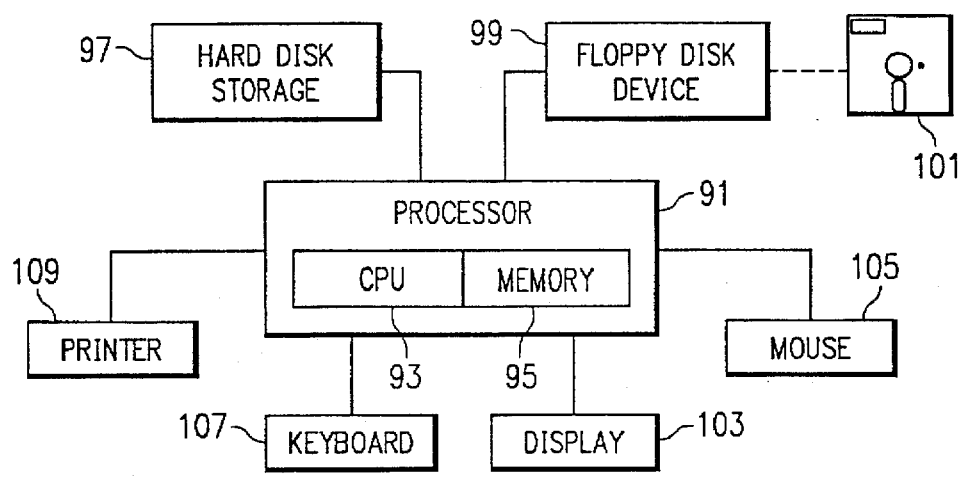
FIG. 8 is a block diagram representation of a computer system for practicing the method and system of the present invention.

Referring now to FIG. 8, there is shown a block diagram of a system according to the present invention. The system includes a processor 91, which includes a central processing unit (CPU) 93 and random access memory 95. The system may also include additional memory in the form of a hard disk storage device 97, a floppy disk device 99, or, preferably, both. Floppy disk device 99 is adapted to receive a diskette 101 that may have recorded thereon the software implementation of the present invention. The system of FIG. 8 includes user interface hardware, including a display 103, a mouse 105, and preferably a keyboard 107. The system may, optionally, include a printer 109.

Figure 9:
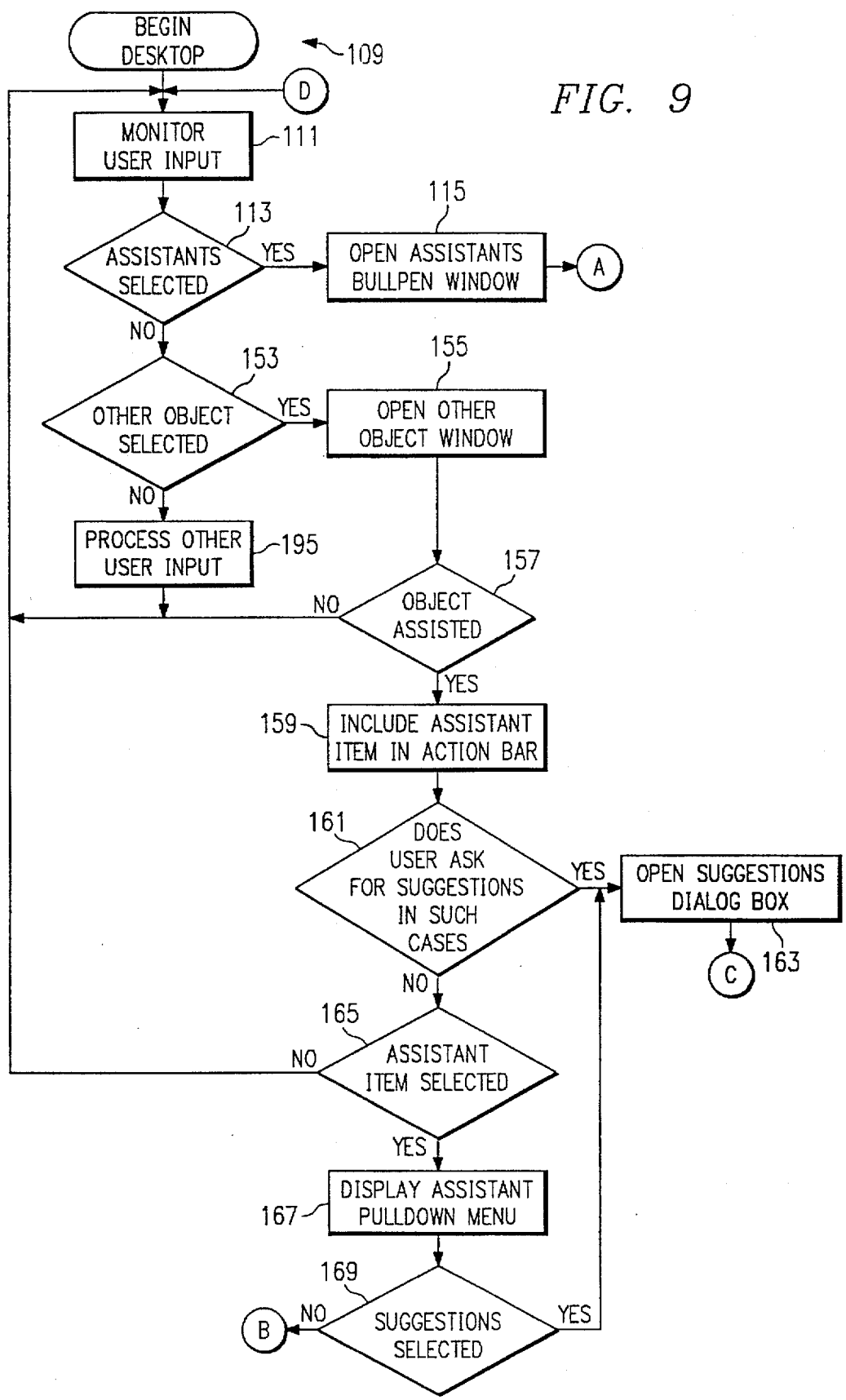
FIGS. 9–12 comprise a flow chart of a preferred software implementation of the method and system of the present invention.
Figure 10:
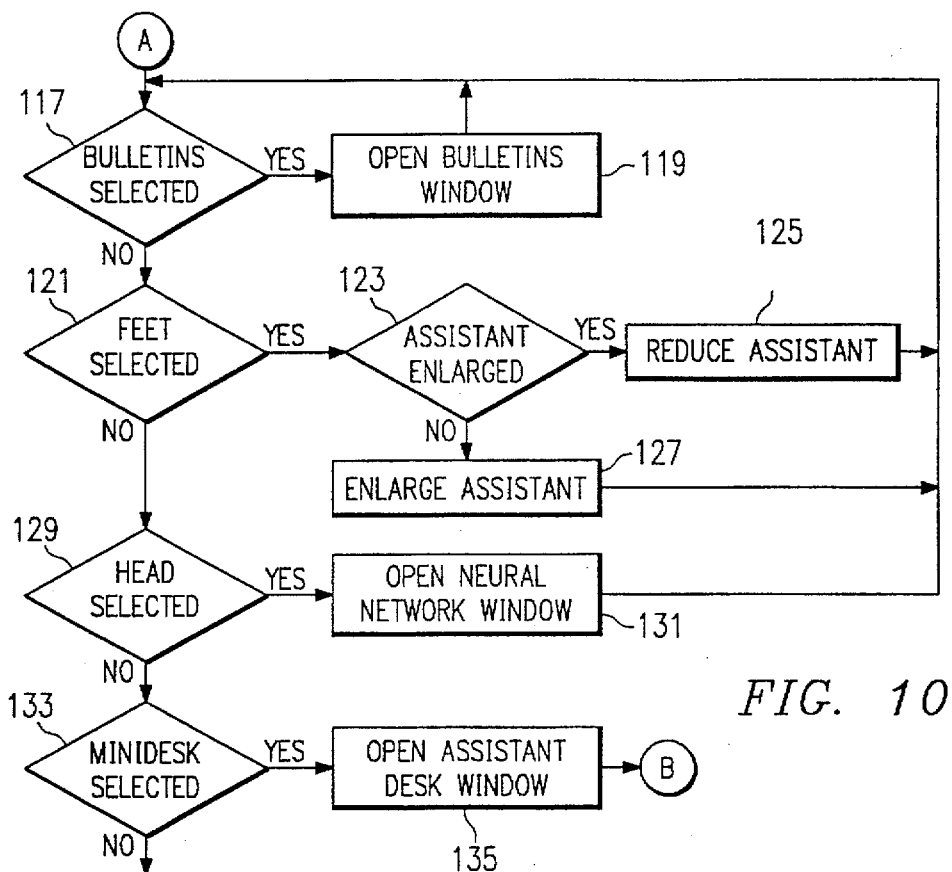

Referring now to FIGS. 9–12, there is shown a flowchart of a preferred software implementation of the present invention. Referring first to FIG. 9, the system first begins the desktop or workplace as indicated generally at block 109. After the desktop is running, the system monitors user input at block 111. If the system receives a user input, the system tests, at decision block 113 whether or not the assistants object has been selected. If it has, the system opens the assistants bullpen window at block 115 and then proceeds to the portion of the flowchart indicated generally by the letter "A", which is shown in FIG. 10.

Referring to FIG. 10, the system tests at decision block 117 whether or not the bulletins object is selected. If it is, the system opens the bulletins window at block 119 and returns. If the bulletins object is not selected at decision block 117 then the system tests at decision block 121 whether or not an assistants feet are selected. If the feet are selected, then the system tests at decision block 123 whether or not the assistant is enlarged. If the assistant is enlarged, then the human figure representation of the assistant is reduced at decision block 125. If the assistant is not enlarged, then the system enlarges the assistant figure at block 127 and returns. Thus, in FIG. 10, the user can toggle between a reduced assistant and an enlarged assistant by selecting the assistant's feet. If at decision block 121, the feet are not selected, then the system tests at decision block 129 whether or not the assistant image's head is selected. If it is, the system opens a neural network window at block 131 and returns. If the head is not selected at decision block 129, then the system tests at decision block 133 whether or not the mini-desk is selected. If it is not, then the system as indicated at "D" returns to continue monitoring user input at block 111 of FIG. 9. If, at decision block 133, the mini-desk is selected, the system opens the assistant desk window at block 135 and proceeds to the portion of the flowchart indicated by the letter "B", which is shown in FIG. 11.

Figure 11:
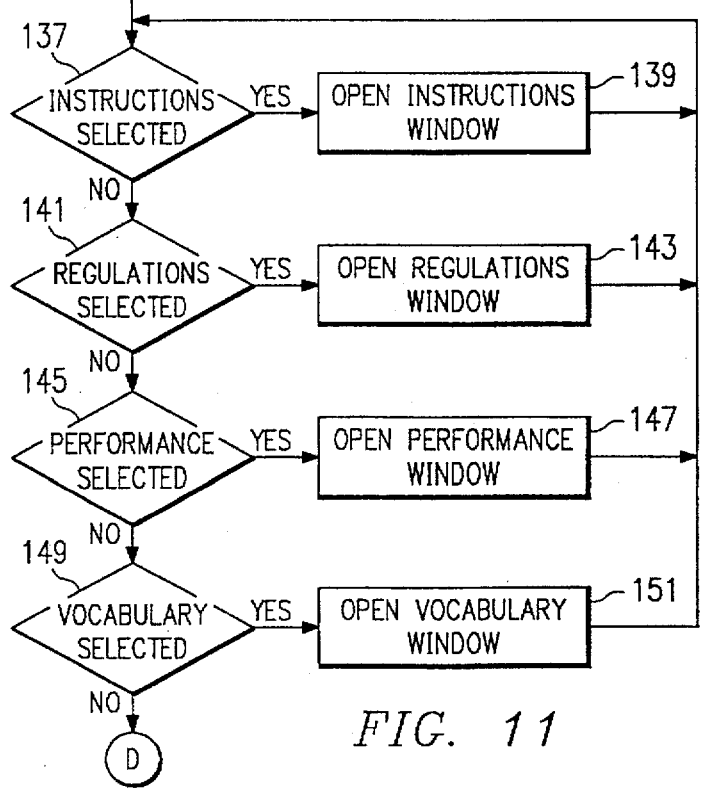

Referring to FIG. 11, the system tests at decision block 137 whether or not instructions are selected and if so, the system opens the instructions window at block 139 and returns. If instructions are not selected, the system tests at decision block 141 whether or not regulations are selected. If they are, then the system opens a regulations window at block 143 and returns. If regulations are not selected, the system tests at decision block 145 whether or not performance is selected. If it is, the system opens a performance window at block 147 and returns. If performance is not selected, then the system tests at decision block 149 whether or not vocabulary is selected. If it is, then the system opens the vocabulary window at block 151 and returns. Finally, if vocabulary is not selected, then the system returns as indicated at "D" to continue to monitor user input at block 111 at FIG. 9.

Referring again to FIG. 9, if the user input is not a selection of assistants, the system tests at decision block 153 whether or not an other object is selected. If it is, the system opens the window for the other object at block 155. Then, the system tests at decision block 157 whether or not the selected object is assisted. If it is not, the system returns to block 11 to continue monitoring user input. If the object is assisted, then, at block 159, the system includes an assistant item in the action bar for the object window. Then, the system tests at decision block 161 whether or not the user asks for suggestions in such cases. If the assistant has learned that the user does ask for suggestions in such cases, the system automatically opens the suggestions dialog box at block 163. If the user does not normally ask for suggestions in such cases, then the system tests at decision block 165 whether or not the assistant item is selected from the action bar. If it is not, the system returns to block 111 to continue monitoring user input. If the assistant item is selected, then the system displays the assistant pull-down menu at block 167 and waits for user input. If, at decision block 169, the user selects suggestions, then the system opens the suggestions dialog box at block 163. If the user does not select suggestions, then the system goes through the routine indicated generally by "B", which is shown in and described in connection with FIG. 11.

Figure 12:
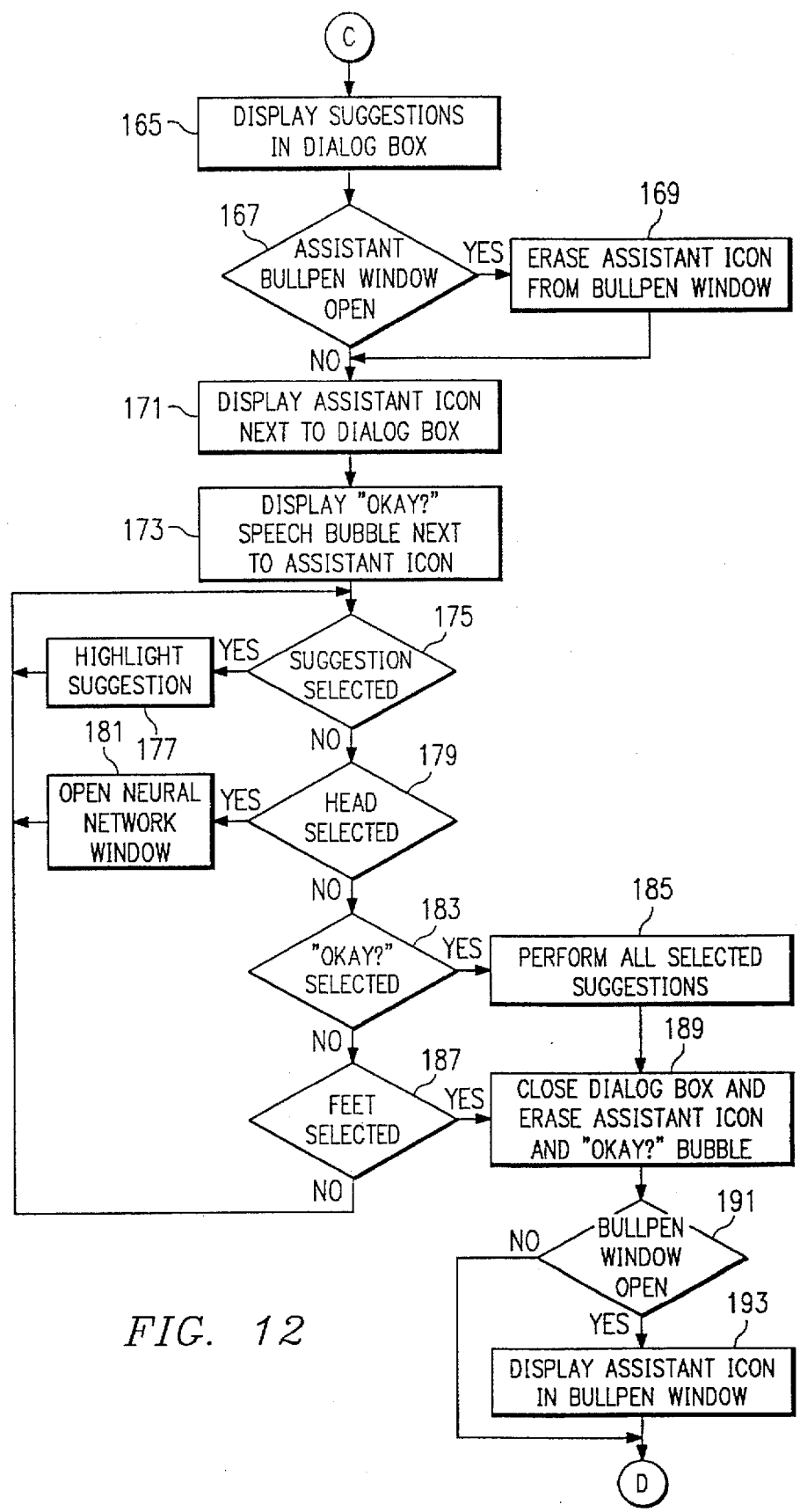

Referring still to FIG. 9, after the system has opened the suggestions dialog box at block 163, the system proceeds as indicated generally by the letter "C", which is shown in FIG. 12. Referring to FIG. 12, the system displays any suggestions in the suggestions dialog box at block 165. Then, the system tests at decision block 167 whether or not the assistant bullpen window is open. If it is, the assistant icon is erased from the bullpen window at block 169. After the assistant icon has been erased from the bullpen window, or if the bullpen window is not open, the system displays the assistant icon next to the dialog box at block 171 and displays the "Okay?" speech bubble next to the assistant icon at block 173 and monitors user input. If, at decision block 175, the user input is the selection of a suggestion, the selected suggestion is highlighted at block 177 and the system returns to continue monitoring user input. If, at decision block 179, the user selects the head of the assistant icon, the system opens the neural network window at block 181 and returns to continue monitoring user input. If, at decision block 183, the user selects the "Okay?" speech bubble, the system performs all selected suggestions at block 185. If the user input at decision block 183 is not selection of the "Okay?" speech bubble, then the system tests at decision block 187 whether or not the assistant's feet are selected. If they are not, the system returns to continue monitoring user input. If the feet are selected, at decision block 187 or if okay has been selected, as described above, the system closes the dialog box and erases the assistant icon and "Okay?" speech bubble at block 189. Then, the system tests at decision block 191 whether or not the assistant bullpen window is open. If it is, the system displays the assistant figure icon in the bullpen window at block 193 and returns to block 111 of FIG. 9 to continue monitoring user input. Finally, referring to FIG. 9, if the user input is something other than selection of the assistants icon or another object, the system processes such other user input at block 195 and continues to monitor user input at block 111.

From the foregoing, it may be seen that the present invention provides a useful end user interface for a system of intelligent assistants or agents. While the invention has been particularly shown and described with reference to a preferred embodiment, those skilled in the art will understand that various changes may be made in form and detail without departing from the spirit and scope of the invention.

What is claimed is:

1. A method for performing a selected action within a computer system having a display screen and a graphic pointing device wherein said computer system is capable of performing a plurality of diverse actions, said method comprising the computer implemented steps of:

associating an intelligent assistant with at least one object within said computer system, said intelligent assistant including a neural representation of learned experience with respect to actions within said computer system relating to said at least one object;

displaying an object window within said display screen of said computer system in response to selection of said at least one object by a user utilizing said graphic pointing device, said object window including an action bar;

displaying an assistant item within said action bar within said object window in response to said association of said intelligent assistant with said at least one object; and selectively displaying a pull-down menu containing a suggested action among said plurality of diverse actions in association with said assistant item, said suggested action determined utilizing said neural representation of learned experience with respect to actions within said computer system related to said at least one object.

2. The method according to claim 1, further including the step of performing said suggested action in response to a selection thereof by said user within said pull-down menu.

3. The method according to claim 1, wherein said step of selectively displaying a pull-down menu containing a suggested action among said plurality of diverse actions in association with said assistant item comprises the step of selectively displaying multiple suggested actions among said plurality of diverse actions in association with said assistant item, each of said multiple suggested actions determined utilizing said neural representation of learned experience with respect to actions within said computer system related to said at least one object.

4. The method according to claim 2, further including the step of displaying a graphic representation of a human figure having a head adjacent to said pull-down menu containing a suggested action and a speech bubble adjacent to said head and wherein said step of performing said suggested action in response to a selection thereof comprises the step of performing said suggested action in response to selection of said speech bubble.

5. The method according to claim 4, further including:

selecting the head of said human figure;

automatically opening a neural network window in response to selecting said head; and displaying in said neural network window a graphic representation of a neural network associated with said intelligent assistant.

6. A method for performing a selected action within a computer system having a display screen and a graphic pointing device wherein said computer system is capable of performing a plurality of diverse actions, said method comprising the computer implemented steps of:

displaying at least one assistant icon within said display screen, said at least one assistant icon comprising a mini-icon representative of a selected object, a graphic representation of a human figure symbolizing an intelligent assistant having a neural representation of learned experience with respect to actions within said computer system related to said selected object, and a graphic representation of a desk displayed adjacent to said human figure;

opening an object window for said selected object associated with said intelligent assistant in response to a selection of said mini-icon; and displaying a suggestion dialog box in association with said object window, said suggestion dialog box containing a suggested action among said plurality of diverse actions, said suggested action determined utilizing said neural representation of learned experience with respect to actions within said computer system related to said selected object.

7. A method according to claim 6, further including the step of performing said suggested action in response to a selection thereof by a user within said suggestion dialog box.

* * * * *